United States Patent [19]

Main et al.

[11] 4,428,649
[45] Jan. 31, 1984

[54] POWER MIRROR CONTROL SWITCH

[75] Inventors: Robert T. Main, Arlington Heights; Maurice E. Kennedy, Crystal Lake, both of Ill.

[73] Assignee: Cherry Electrical Products Corporation, Waukegan, Ill.

[21] Appl. No.: 277,897

[22] Filed: Jun. 26, 1981

[51] Int. Cl.³ .................. H01H 9/00; H01H 19/00; B60R 1/06
[52] U.S. Cl. .................. 350/289; 200/1 V; 200/4; 200/5 R; 200/6 A; 200/16 D; 200/153 A; 200/283; 200/292
[58] Field of Search .................. 350/289; 200/4, 6 A, 200/6 R, 6 C, 283, 292

[56] References Cited

U.S. PATENT DOCUMENTS

| | | | |
|---|---|---|---|
| 2,808,476 | 10/1957 | Elliott | 200/6 A |
| 3,835,270 | 9/1974 | Dufresne | 200/6 A |
| 3,849,611 | 11/1974 | Walker, Jr. | 200/5 A |
| 4,245,137 | 1/1981 | Hirai et al. | 200/6 A X |
| 4,246,452 | 1/1981 | Chandler | 200/6 A X |
| 4,249,086 | 2/1981 | Mochizuki | 350/289 |
| 4,316,067 | 2/1982 | Whiteman, Jr. | 200/292 X |
| 4,356,357 | 10/1982 | Fisher | 200/6 A X |

FOREIGN PATENT DOCUMENTS

| | | | |
|---|---|---|---|
| 653851 | 12/1962 | Canada | 200/4 |
| 2046022 | 11/1980 | United Kingdom | 200/4 |

Primary Examiner—F. L. Evans
Attorney, Agent, or Firm—Willian, Brinks, Olds, Hofer, Gilson & Lione Ltd.

[57] ABSTRACT

A power mirror remote control switch includes a switch body which supports a printed circuit board and two stacked, insulated levels of conducting terminal fingers which extend over the board. A four-way position control key overhangs the terminal fingers. The control key is pressed to flex selected terminals into conductive contact with underlying portions of the printed circuit board, thereby establishing conductive connections for energizing motors which rotate or tilt at least two power mirrors. A sliding switch is provided to define which one of the two mirrors is to be moved in the direction defined by the position control key.

16 Claims, 7 Drawing Figures

POWER MIRROR CONTROL SWITCH

TECHNICAL FIELD OF THE INVENTION

The invention relates to power mirrors which are disposed on a vehicle such as an automobile and are remotely adjusted in position by means of electric motors. More particularly, the invention relates to a remote control switch which controls the motors and the associated movement of the mirrors.

BACKGROUND OF THE INVENTION

In operating a motor vehicle, for example an automobile, it is often necessary to adjust the position of an externally mounted mirror or mirrors so that the driver can view the road to the rear of the vehicle. If the vehicle is moving when such an adjustment is required, it is difficult, if not impossible, for the driver to adjust the mirror and still maintain control of the vehicle. Consequently, drivers will either not bother to adjust their mirrors or will attempt to make an adjustment while the vehicle is moving. In either case, a safety hazzard is presented.

It has been suggested that drivers will be encouraged to align their mirrors if means are provided for adjusting the mirrors from within the vehicle. Thus, various mechanical and electrical systems have been devised to remotely control the movement of mirrors that are mounted on the exterior of a vehicle. More particularly, it has been suggested that small electric motors may be conveniently operated to remotely adjust the viewing position of "power mirrors." It is desirable to control the operation of such motors by means of a relatively simple, inexpensive and reliable remote control switch.

Accordingly, it is an object of the invention to provide a relatively compact and reliable remote control switch for operating apparatus which selectively adjusts the viewing position of power mirrors.

A further object of the invention is to provide such a switch with two levels of conducting terminal fingers which are selectively pressed to contact associated underlying portions of a printed circuit board.

Another object of the invention is to provide such a switch with a four-way control key which is tilted in selected directions, so that upstanding tabs of the key press selected terminal fingers into conductive contact with the printed circuit board.

A further object of the invention is to provide each of such tabs with a step in its leading edge for evenly pressing terminal fingers into contact with the printed circuit board.

Another object of the invention is to provide a remote control switch with a sliding key which selects a power mirror for movement and which includes a detent mechanism that resists the sliding movement of the key.

These and other objects of the invention will become apparent from a review of the drawings and of the following detailed description of a preferred embodiment of the invention.

SUMMARY OF THE INVENTION

In order to achieve the objects of the invention and to overcome the problems of the prior art, the power mirror remote control switch of the invention includes a switch body that supports two levels of radially extending conducting terminal fingers and a four-way position control key mounted for tilting movement over a printed circuit board. The position control key has upstanding tabs which each overhang two terminal fingers. When the key is tilted in a selected direction, a tab presses its underlying terminal fingers into conductive contact with conducting areas of the printed circuit board and thereby establishes connections for driving a motor which adjusts the viewing position of a power mirror. Each tab has a step formed in its leading edge to evenly press its underlying fingers into contact with the printed circuit board.

A sliding switch is provided to select which one of two power mirrors is to be moved in accordance with the operation of the position control key.

DETAILED DESCRIPTION OF THE PREFERRED EMBODIMENT

Figure 1:
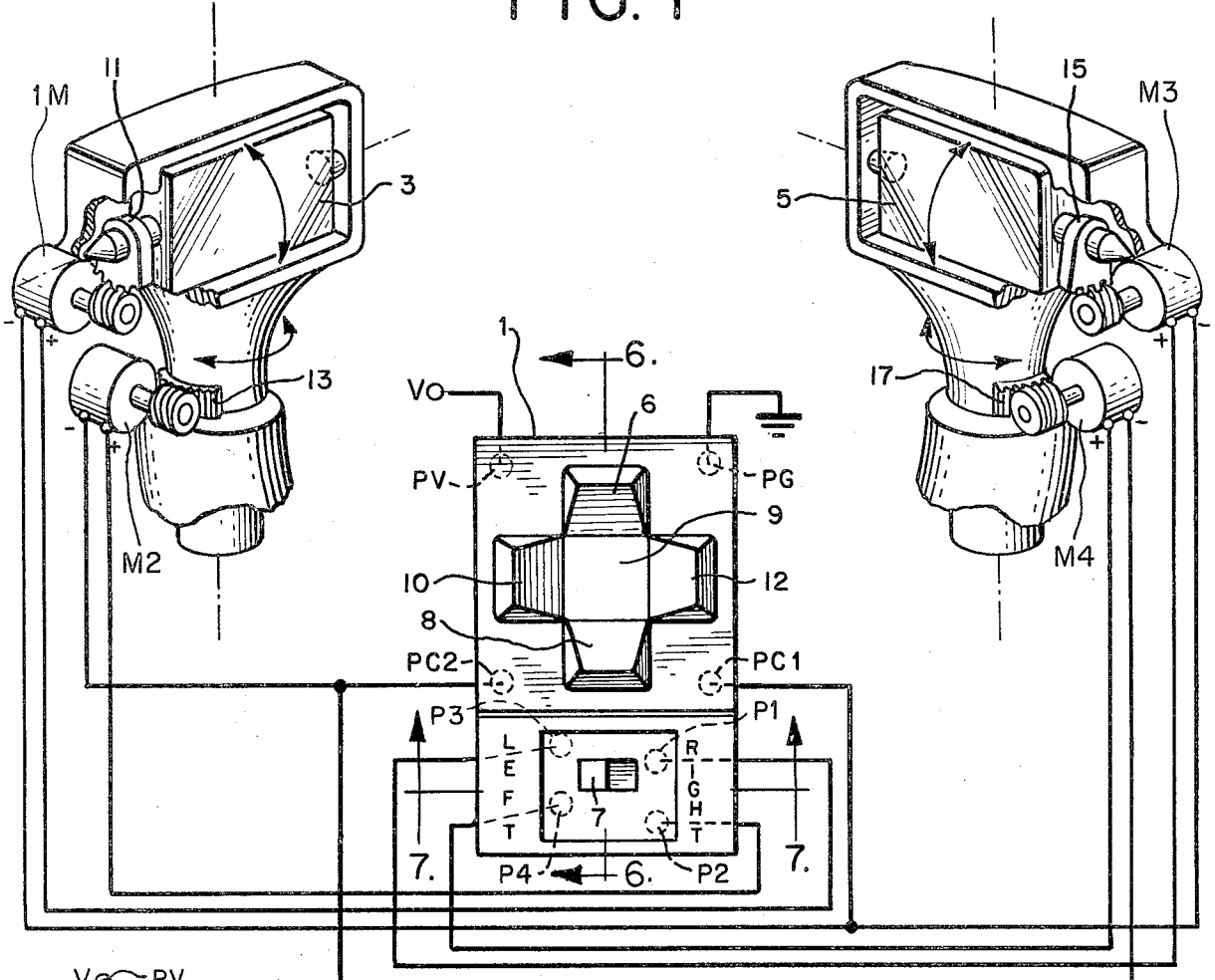
FIG. 1 illustrates a perspective view of a preferred embodiment of a remote control switch and associated mirror control apparatus for a left mirror and for a right mirror.

The remaining portion of the specification will describe a preferred embodiment of the invention when read in conjunction with the attached drawings, in which like reference characters designate identical apparatus.

FIG. 1 illustrates a perspective view of a preferred embodiment of a remote control switch 1 and of apparatus which is operated by the switch 1 to adjust the viewing position of two mirrors 3 and 5 which are mounted for example, on the exterior of a vehicle such as an automobile.

In order to facilitate an understanding of the invention, it will be assumed that the mirror 3 is mounted on the left side of the vehicle and the mirror 5 is mounted on the right side of the vehicle. In operation, a mirror select key 7 of the switch 1 is moved to the left to select the left mirror 3 and is moved to the right to select the right mirror 5. After a particular mirror is selected, a position control key 9 is operated to tilt the selected mirror up or down or to pivot the mirror to the right or left.

The remote control switch 1 has eight conducting terminal pins which extend from its base. The pins may be plugged into mating connectors (not shown) which carry power and ground to the switch and conduct selected remote control signals from the switch. More particularly, a conducting pin PV is connected to a voltage source V and a pin PG is connected to circuit ground. A pin P1 is conductively connected to the positve side of a first motor M1 and a conducting pin P3 is conductively connected to the positive side of a motor M3. A common conducting pin PC1 is conductively connected to the common negative side of both of the motors M1 and M3. A pin P4 is connected to the positive side of a motor M4 and a pin P2 is connected to the positive side of a motor M2. A pin PC2 is connected to the negative side of the motors M2 and M4 to provide the common or ground connection for the motors.

The motors M1 and M2 control the movement of the left mirror 3 and the motors M3 and M4 control the movement of the right mirror 5. The motor M1 operates a known mechanism 11 which tilts the mirror 3 up or down in accordance with the direction of operation of the motor. Likewise, the motor M3 operates a similar mechanism 15 which tilts the mirror 5. The motor M2 operates a mechanism 13 which rotates the mirror 3 to the right or left, depending upon the direction of operation of the motor. Likewise, the mirror 5 is rotated to the right or left by the motor M4 and its associated mechanism 17. The motors M1, M2, M3 and M4 and associated tilt mechanisms 11 and 15 and rotate mechanisms 13 and 17 are shown to generally illustrate an apparatus which will move two mirrors under the control of the remote control switch 1. It should be understood however that the switch 1 may be used with any suitable apparatus of a mirror control system or other known remote control system, without departing from the invention.

Figure 2:
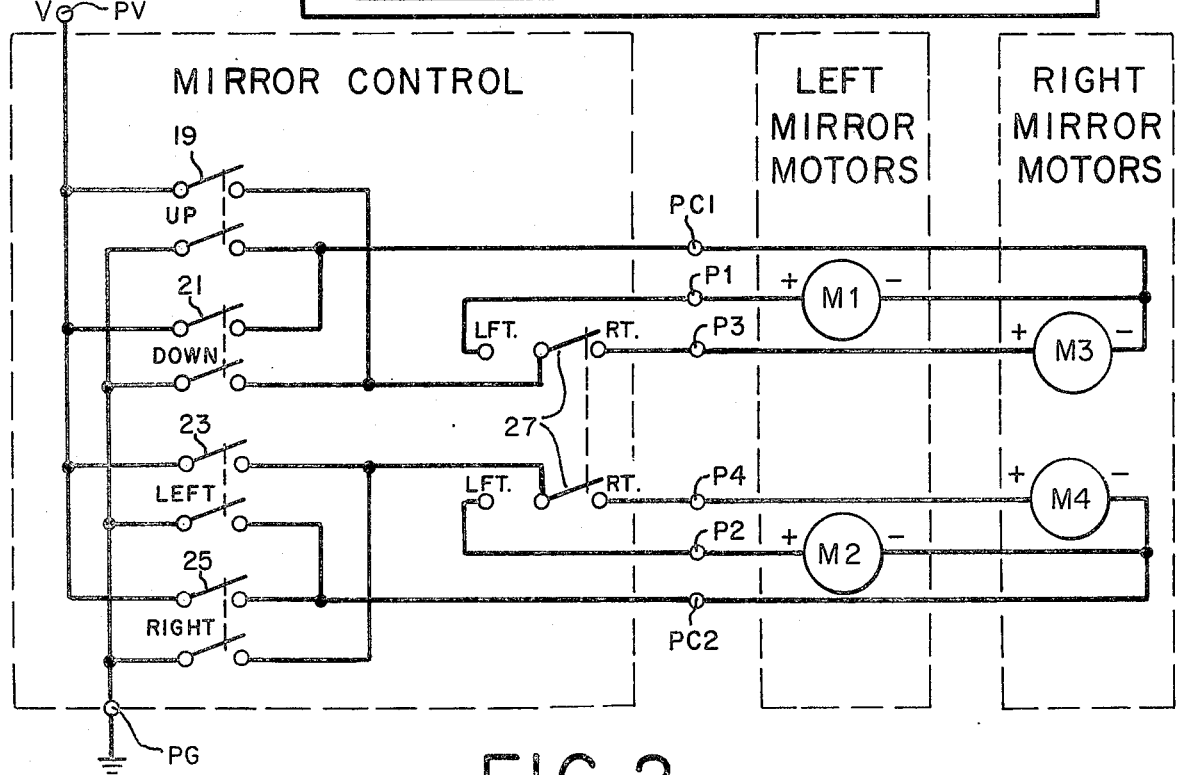
FIG. 2 illustrates a circuit diagram of a motor control circuit for the remote control switch of FIG. 1.

The operation of the remote control switch 1 and associated apparatus for moving the mirrors 3 and 5 may be better understood by reference to FIG. 2, which illustrates a circuit diagram of a motor control circuit for the remote control switch 1. As shown in FIG. 2, the voltage V is applied at the power terminal pin PV and the pin is conductively connected to one input line of double pole, single throw position control switches 19, 21, 23, and 25. Likewise, circuit ground is applied to the ground terminal pin PG and the pin is conductively connected to another input line of the switches 19-25. The switches 19-25 are operated by the position control key 9 to move the left and right mirrors 3 and 5 to selected viewing positions. In general, it should be understood that only one of the switches 19-25 may be closed at any given time.

A double pole, double throw mirror select switch 27 is operated by the key 7 to select either the left mirror or right mirror for movement. In operation, if the the key 7 is pushed to the right, the switch 27 is closed to the right and the right mirror is selected for movement. Thereafter, if the key 9 is depressed in an area 6, the switch 19 is closed so that the voltage V is applied at the terminal pin P3 and circuit ground is applied at the terminal pin PC1. The indicated voltage across P3 and PC1 energizes the motor M3, so that the right mirror 5 is tilted upwardly by the mechanism 15. If the key 9 is released and then pressed in an area 8, the switch 19 is opened and the switch 21 is closed so that the voltage V is applied to the pin PC1 and ground is applied to the pin P3. The reverse polarity voltage across P3 and PC1 reverses the direction of operation of the motor M3 and mechanism 15, so that the right mirror 5 is tilted downwardly. If the key 9 is released and then pressed in an area 10, the switch 21 is opened and the switch 23 is closed so that the voltage V is applied to the pin P4 and circuit ground is applied to the pin PC2. The indicated voltage causes the motor M4 and mechanism 17 to rotate the mirror 5 to the left. If the key 9 is released and then pressed in an area 12, the switch 23 is opened and the switch 25 is closed so that the voltage V is applied to the pin PC2 and ground is applied to the pin P4. The indicated reverse polarity voltage reverses the operation of the motor M4 and mechanism 17, so that the mirror 5 is rotated to the right.

If the key 7 and associated switch 27 are closed to the left, the motors M1 and M2 of the left mirror are operated by the key 9. Thus, if the key 9 is depressed in the area 6, the voltage V is applied to the pin P1, ground is applied to the pin PC1 and the motor M1 tilts the mirror 3 upwardly. If the key 9 is pressed in the area 8, the voltage V is applied to the pin PC1, ground is applied to the pin P1 and the motor M1 is reversed, so that the mirror 3 tilts downwardly. If the key 9 is pressed in the area 10, the voltage V is applied to the pin P2, ground is applied to the pin PC2 and the motor M2 rotates the mirror 3 to the left. If the key 9 is pressed in the area 12, the voltage V is applied to the pin PC2, ground is applied to the pin P2 and the motor M2 is reversed, so that the mirror 3 is rotated to the right.

Figure 3:
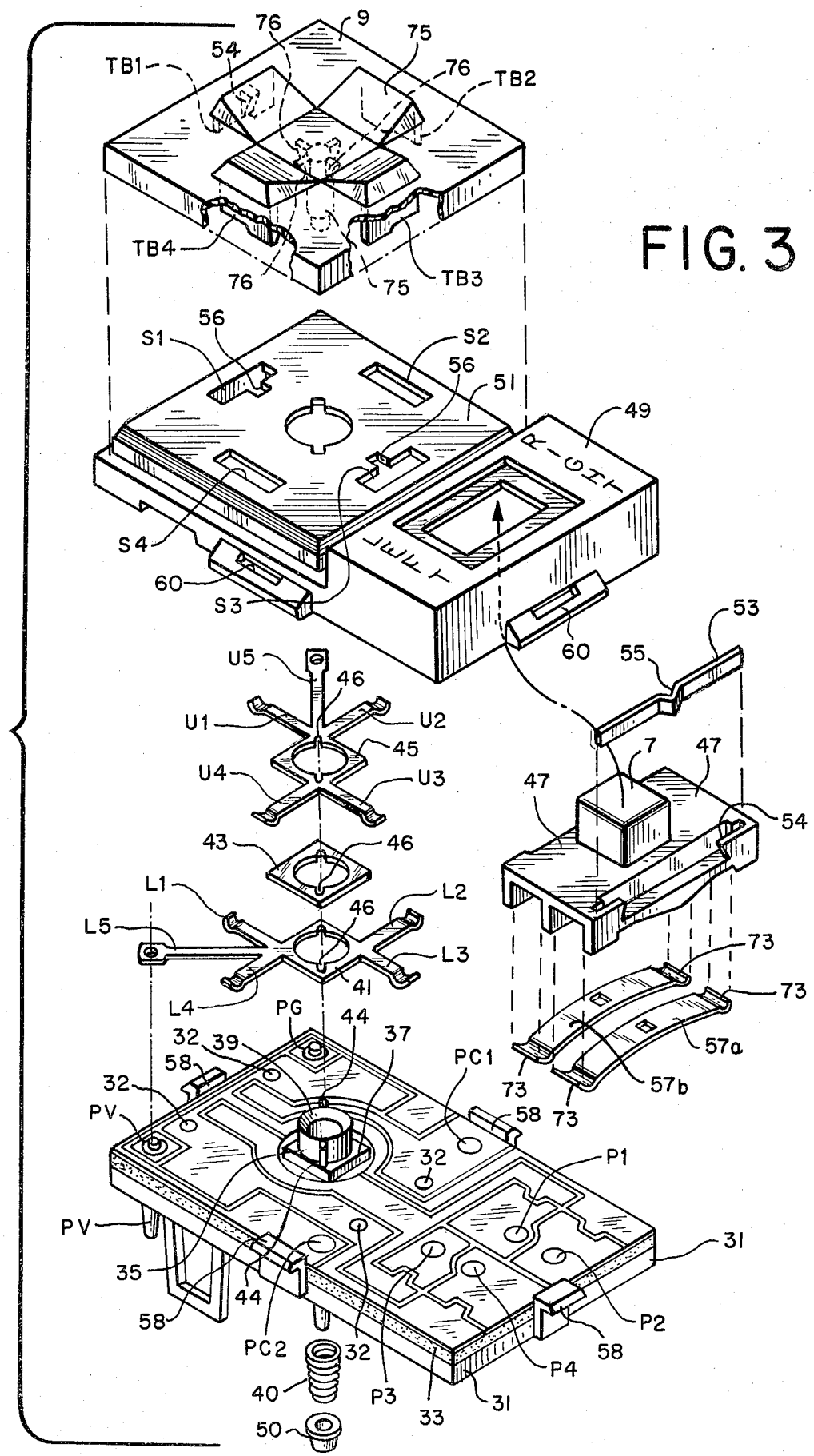
FIG. 3 illustrates an exploded view of the components of the remote control switch of FIG. 1.

FIG. 3 illustrates an exploded view of the components of the remote control switch of FIG. 1. The switch includes a base plate 31 that may be made of, for example, polycarbonate Lexan. The base plate 31 supports a printed circuit board 33 which has conducting areas that are formed in a manner known to the art. The printed circuit board is affixed to the base plate by pins 32 which are formed in the base plate and which extend through holes in the printed circuit board. The pins are staked over adjacent to the top surface of the printed circuit board, so that the board is firmly affixed to the base plate. The base plate 31 also has an upstanding pedestal 35 formed therein and the pedestal has a raised shoulder portion 37 which extends above the surface of the printed circuit board 33.

Electrical connections are made on the printed circuit board by conducting terminal fingers L1, L2, L3, L4 and L5 of a lower terminal plate 41 and conducting terminal fingers U1, U2, U3, U4 and U5 of an upper terminal plate 45. In assembling the switch, the lower plate 41 is inserted over the pedestal 35 and is pressed downwardly until it rests on the raised shoulder 37. The raised shoulder 37 holds the terminal fingers of the conducting lower terminal plate 41 in spaced relation to the conducting areas of the underlying printed circuit board. An insulating spacer 43 is inserted over the pedestal 35 and is pressed downwardly into contact with the lower terminal plate 41. The conducting upper terminal plate 45 is then inserted over the pedestal 35 and is pressed downwardly until it abuts the insulating spacer 43. Thus, the pedestal 35 supports the lower terminal plate 41 and upper terminal plate 45 in insulated, stacked relation. It should generally be understood that the lower and upper terminal plates have the same shape, although the plates are inserted over the pedestal with different angular orientations. Moreover, it should be appreciated that the terminal plates 41 and 45 and the spacer 43 are supported on the pedestal at a fixed angular orientation by raised rails 44 which engage corresponding slots 46 of the plates and spacer.

As shown in FIG. 3, the mirror select key 7 is comprised of a body portion 47 which is made of for example, Delrin. The body 47 is mounted for sliding movement in a raised box portion 49 of a housing 51 which is made of, for example, polycarbonate Lexan. A resilient detent spring 53 is carried in a slot 54 of the body and a raised cam portion 55 of the spring faces outwardly. Two curved, conducting terminal bars 57a and 57b are engaged with the body 47 and slide with the body to electrically connect underlying conducting portions of the printed circuit board.

The position control key 9 is made of material such as polycarbonate Lexan and has four downwardly extending tabs TB1, TB2, TB3 and TB4. The tabs extend through corresponding slots S1, S2, S3 and S4 of the housing 51 when the key 9 is engaged with the housing. The tabs TB1 and TB3 each have a keying rib 54 which passes through an associated slot 56 when the key 9 is engaged with the housing. The ribs 54 ensure that the key 9 is properly oriented with respect to the housing. The housing 51 is engaged with the base 31 by locking tabs 58 which snap into corresponding locking brackets 60 of the base.

Figure 4:
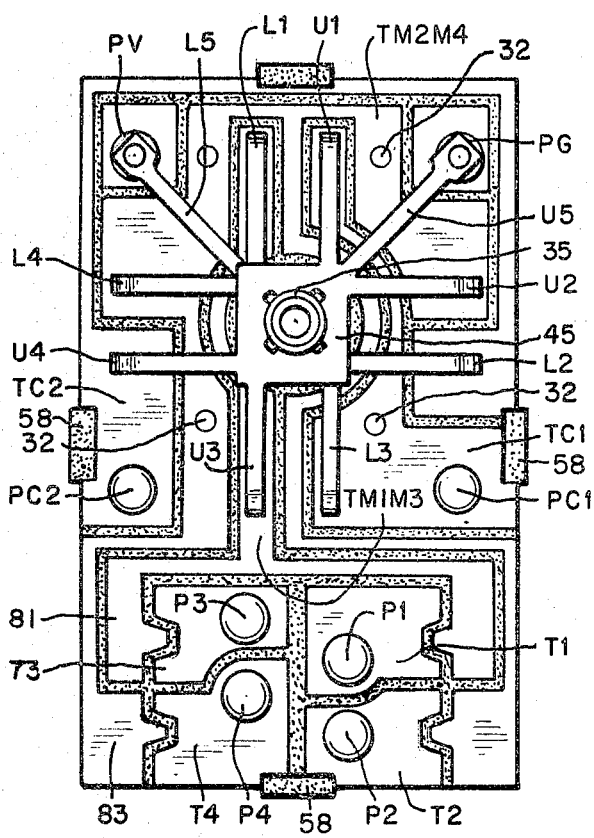
FIG. 4 illustrates a plan view of a printed circuit board and conducting terminal fingers of the remote control switch of FIG. 1.

FIG. 4 illustrates a plan view of the printed circuit board with the upper plate 45, lower plate 41 and insulating spacer 43 engaged over the pedestal 35. The terminal finger L5 of the lower terminal plate 41 is conductively connected, for example by a press fit, to the head of the underlying conducting terminal pin PV, which extends through the printed circuit board 33 and underlying base plate 31. The pin PV is affixed to the printed circuit board for example, by staking a shoulder of the pin in a manner known to the art, so that the staked shoulder abuts the underside of the board. The terminal finger U5 of the upper terminal plate 45 is conductively connected to the underlying conducting pin PG and is affixed to the printed circuit board in the same manner.

As illustrated in FIGS. 3 and 4, the conducting terminal pins PC1, PC2, P1, P2, P3 and P4 are mounted on the printed circuit board in the manner described for the pin PV. The head portion of the conducting pin PC2 is held in conductive contact with a conducting terminal strip TC2 of the printed circuit board and the conducting terminal pin PC1 is held in conductive contact with a conducting terminal strip TC1 of the circuit board. Moreover, the pin P1 is held in conductive contact with a terminal strip T1, the pin P2 conductively contacts a terminal strip T2, the pin P3 conductively contacts a terminal strip T3 and the pin P4 conductively contacts a terminal strip T4.

Figure 5:
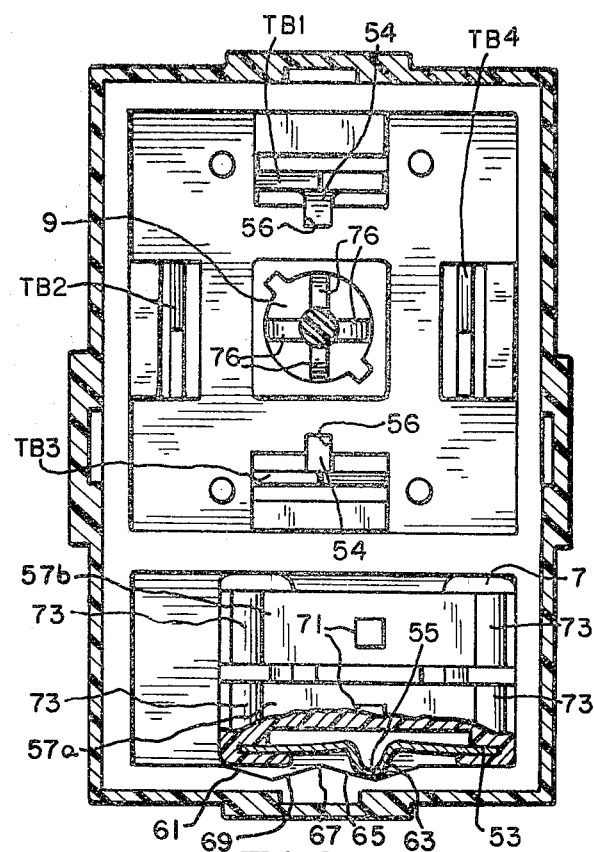
FIG. 5 illustrates a plan view of the underside of the housing of the remote control switch of FIG. 1, with a mirror select key and a position control key engaged with the housing.

FIG. 5 illustrates a plan view of the underside of the housing 51 with the engaged position control key 9 and mirror select key 7. As shown in FIG. 5, the raised cam portion 55 of the detent spring 53 extends outwardly from the body of the key 7 to engage a cam track 61. In operation, if the key 7 is at rest in a right-most position with respect to FIG. 5, the cam 55 of the detent spring will rest in an area of the cam track generally designated 63. If the key 7 is moved to the left, the cam 55 will slide along the track 61 and will be pressed inwardly as it moves along a ramp 65 of the track. The spring pressure of the cam 55 against the ramp 65 provides a counterforce to the leftward movement of the sliding key and thereby ensures that the key will move only in response to a positive actuating force. As the key moves through a center position, the cam 55 passes over the inward edge 67 of the track and engages a ramp 69. The cam 55 presses outwardly against the ramp 69 and therefore forces the body of the key to snap to its left-most position. The above-described operation will be repeated in reverse when the key 7 is moved to its right-most position.

Figure 7:
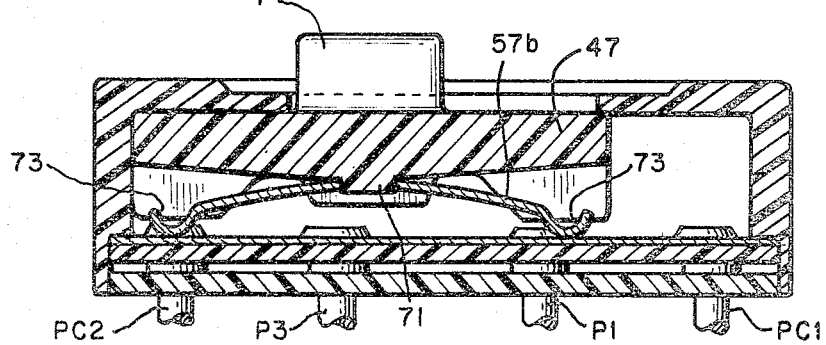
FIG. 7 illustrates a cross-sectional view of the assembled remote control switch, taken along a line 7—7 of FIG. 1.

FIG. 7 illustrates a cross-sectional view of the key 7, taken along the line 7—7 of FIG. 1. As shown in FIGS. 5 and 7, arcuate conducting terminal bars 57a and 57b are engaged over upstanding pegs 71 formed in the body 47 of the key 7. Thus, the terminal bars 57a and 57b move with the body of the key and contact ends 73 of the bars press against underlying areas of conducting terminal strips of the printed circuit board to establish conductive connections for energizing the motors of either the left or the right mirror.

Figure 6:
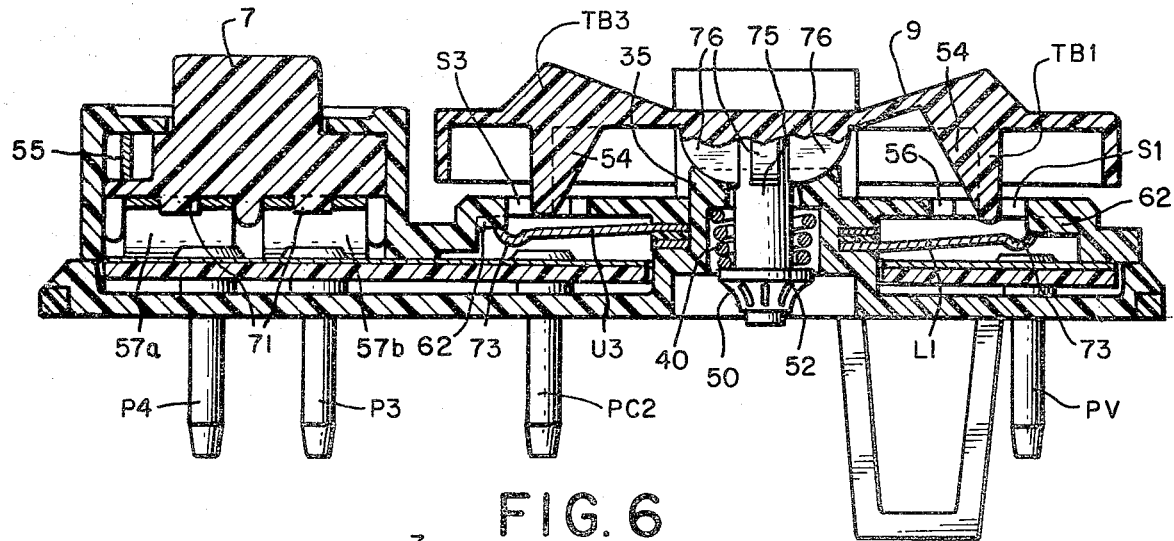
FIG. 6 illustrates a cross-sectional view of the assembled remote control switch, taken along a line 6—6 of FIG. 1.

FIG. 6 illustrates a cross-sectional view of the assembled remote control switch, taken along the line 6—6 of FIG. 1. As shown in FIG. 6, the position control key 9 has a central shaft 75 which extends downwardly into the pedestal 35. The shaft has radial ribs 76 formed at its base to engage the bearing surface 39 of the pedestal, so that the key 9 is mounted for pivotal movement with respect to the pedestal. A spring 40 is pressed over the free end of the shaft 75 and a retaining nut 50 is inserted over the end of the shaft and is moved upwardly until it abuts a shoulder 52. The nut 50 is formed to tightly engage the shaft, so that it retains the spring in compression and thereby provides a downward force on the shaft. When the key 9 is tilted from a horizontal, neutral position and is thereafter released, the spring force on the shaft causes the key 9 to return to its neutral position.

As explained above, the position control key 9 has four tabs TB1, TB2, TB3 and TB4 which extend through corresponding slots S1, S2, S3 and S4 of the housing 51 when the key is engaged with the housing 51 and the ribs 76 are supported on the bearing surface 39. The slots S1, S2, S3 and S4 are dimensioned to block linear movement of the key 9 in all directions, while allowing the key 9 to tilt with respect to the housing. In its neutral position, the key 9 is oriented so that the four tabs TB1–TB4 are suspended over underlying conducting terminal fingers of the plates 41 and 45 and positioning tabs 62 of the slots S1, S2, S3 and S4 engage their associated underlying terminal fingers to hold the fingers in their neutral positions. In the neutral position, the tab TB1 overhangs the terminal fingers L1 and U1, the tab TB2 overhangs the terminal fingers L2 and U2, the tab TB3 overhangs the terminal fingers L3 and U3 and the tab TB4 overhangs the fingers L4 and U4.

After the key 7 is moved to select one of the mirrors, the position control key 9 is tilted on its pedestal so that one of the tabs TB1–TB4 presses against two underlying terminal fingers of the terminal plates 41 and 45 and thereby moves the fingers into conductive contact with underlying conductive areas of the printed circuit board 33. In general, it should be understood that the position control key 9 may be tilted to press no more than two conducting fingers of the plates 41 and 45 against the printed circuit board at one time.

With reference to FIG. 3, it can be seen that each of the tabs has a step formed in its leading edge. The lower extending portion of each tab is positioned over an underlying terminal of the upper terminal plate 45 and the raised portion of each tab is positioned over an underlying terminal finger of the lower terminal plate 41. Thus, when a tab is tilted downwardly toward its underlying terminal pair, the tab first engages the upper finger of the pair and pushes it down until it is in the plane of the lower finger of the pair. Thereafter, the tab engages the lower finger and, as the tab continues to move downwardly, it presses the fingers evenly against the printed circuit board. The steps in the tabs are provided to ensure that each terminal pair will contact the printed circuit board in response to a relatively light pressure on the key 9. When the key 9 is released from its downwardly tilted position, the spring 40 pushes the key to its neutral position and the selected terminal fingers spring back to their open circuit positions.

Undesirable electrical arcing between energized terminal fingers and the printed circuit board is avoided by coating the fingers and the printed circuit board with a contact lubricant that is known in the art. The lubricant is a weakly conducting substance which, in operation, provides a relatively low current path between energized fingers and the printed circuit board as the fingers make or break contact with the board.

The conductive connections that are made within the remote control switch will hereafter be described with respect to FIG. 4. In operation, a voltage V is applied to the conducting pin PV and to its conductively connected lower terminal plate 41. Circuit ground is applied to the pin PG and to its conductively connected upper terminal plate 45. There is no short circuit between the terminal plates because, as explained above, the plates are separated by an insulating spacer 43. Moreover, the lower plate 41 is suspended above the printed circuit board by the insulating shoulder 37.

As explained for the circuit diagram of FIG. 2, the pin P1 is connected to the positive side of the motor M1, the pin P2 is connected to the positive side of the motor M2, the pin P3 is connected to the positive side of the motor M3, the pin P4 is connected to the positive side of the motor M4, the pin PC1 is connected to the negative or common side of the motors M1 and M3, and the pin PC2 is connected to the negative or common side of the motors M2 and M4.

If the mirror select key 7 is moved to its left position with respect to FIG. 4, to select the left mirror, the ends of the terminal bar 57b will conductively connect the terminal strip T1 and the pin P1 with a corresponding conducting area 81 of a conducting terminal strip TM1M3 of the printed circuit board. Likewise, the terminal bar 57a will connect the terminal strip T2 and the pin P2 with a corresponding conducting area 83 of a conducting terminal strip TM2M4 of the printed circuit board. Thereafter, if the position control key 9 is depressed in the area 6, the tab TB1 will press the power terminal finger L1 into conductive contact with an underlying conducting portion of the terminal strip TM1M3 and power will be applied to the pin P1. The control key 9 will also press the terminal finger U1 into conductive contact with an underlying portion of the terminal strip TC1, so that ground is applied to the pin PC1. The above-indicated connections for TB1 are provided in the circuit of FIG. 2 by closing the switch 27 to the left and closing the switch 19.

The voltage across P1 and PC1 is removed by releasing the position control key 9 so that the key is returned to its neutral position by the spring 40. If the key 9 is then depressed in the area 8, the tab TB3 presses the power terminal finger L3 into conductive contact with the terminal strip TC1 and the pin PC1 and presses the ground terminal finger U3 into conductive contact with the terminal strip TM1M3 and the pin P1. Thus, ground is applied to the pin P1 and power is applied to the pin PC1. The connections for TB3 are provided in the circuit of FIG. 2 by closing the switch 21, when the switch 27 is closed to the left.

If the position control key 9 is depressed in the area 10, the tab TB4 will press the power terminal finger L4 into conductive contact with the terminal strip TM2M4 and the pin P2. The tab TB4 will also press the ground terminal finger U4 into conductive contact with the terminal strip TC2 and the pin PC2. The indicated connections provide a ground signal at the pin PC2 and a voltage signal at the pin P2. The switch connections are provided in the circuit of FIG. 2 by closing the switch 23, when the switch 27 is closed to the left.

If the position control key 9 is depressed in the area 12, the tab TB2 presses the power terminal finger L2 into conductive contact with the terminal strip TC2 and pin PC2 and presses the ground terminal finger U2 into conductive contact with the terminal strip TM2M4 and pin P2. Thus, power is applied to the pin PC2 and circuit ground is connected to the pin P2. With reference to FIG. 2, the indicated connections are provided by closing the switch 25, when the switch 27 is closed to the left.

If the mirror select key 7 is moved to its right-most position, the ends of the terminal bar 57b will establish a conductive connection between the terminal strip TM1M3 and the pin P3. Likewise, the terminal bar 57a will provide a conductive connection between the terminal strip TM2M4 and the pin P4. If the position control key 9 is pressed so that the tab TB1 establishes conductive connections for the underlying terminal fingers L1 and U1, power will be applied from the terminal finger L1 to the terminal strip TM1M3 and the pin P3 and circuit ground will be applied from the terminal finger U1 to the terminal strip TC1 and the pin PC1. The indicated connections are provided in the circuit of FIG. 2, if the switch 19 is closed when the switch 27 is closed to the right.

If the position control key 9 is pressed so that the tab TB3 establishes conductive connections for the fingers L3 and U3, power is applied from the finger L3 to the terminal strip TC1 and the pin PC1 and circuit ground is applied from the finger U3 to the terminal strip TM1M3 and the pin P3. The indicated switch connections are provided in the circuit of FIG. 2, if the switch 21 is closed when the switch 27 is closed to the right.

If the position control key 9 is pressed so that the tab TB2 establishes conductive connections for the terminal fingers L2 and U2, power is applied from the terminal finger L2 to the terminal strip TC2 and the pin PC2. Likewise, circuit ground is applied from the terminal finger U2 to the terminal strip TM2M4 and the pin P4. The indicated circuit connections are provided in the circuit of FIG. 2, if the switch 23 is closed when the switch 27 is closed to the right.

If the position control key 9 is pressed so that the tab TB4 establishes conductive connections for the terminal fingers L4 and U4, power is applied from the terminal finger L4 to the terminal strip TM2M4 and the pin P4, and circuit ground is applied from the terminal finger U4 to the terminal strip TC2 and the pin PC2. The indicated circuit connections are provided in the circuit of FIG. 2, if the switch 25 is closed when the switch 27 is closed to the right.

The above-indicated internal switch connections for the remote control switch 1 will provide the required power and ground connections for operating two power mirrors in the manner described with respect to the system of FIG. 1. However, it should be understood that the switch of the invention may be employed to provide power connections for other systems, without departing from the spirit of the invention.

Accordingly, the invention may be embodied in other specific forms without departing from its spirit or essential characteristics. The present embodiment is, therefore, to be considered in all respects as illustrative and not restrictive, the scope of the invention being indicated by the claims rather than by the foregoing description. All changes which come within the meaning and range of the equivalents of the claims are intended to be embraced therein.

I claim:

1. An improved remote control switch, comprising:
    board means having a plurality of conducting areas formed thereon;
    a first electrically conducting terminal plate including a plurality of electrically conducting, outwardly extending terminal fingers;
    a second electrically conducting terminal plate including a plurality of electrically conducting, outwardly extending terminal fingers;
    means for supporting said first and second terminal plates in insulated, stacked relation above said board means, so that terminal fingers of one plate do not overlap the terminal fingers of the other plate;
    control key means for selectively pressing terminal fingers into conductive contact with underlying conducing areas of said board means;
    electrically conducting bar means; and
    select key means for slidingly supporting said electrically conducting bar means and for sliding said bar means to conductively connect conducting areas of said board means.

2. The switch of claim 1 further including detent means for resisting movement of said select key means between two opposite switch positions.

3. The switch of claim 2 wherein said detent means includes:
    a detent spring mounted in said select key means for resilient flexing movement transverse to the path of sliding movement of said select key means, the detent spring having an outwardly extending cam portion; and
    a detent track inclined for resisting the movement of said cam portion when the select key means is moved between said two switch positions.

4. The switch of claim 1 wherein said control key means includes a plurality of upstanding tabs and means for tiltably supporting said control key means so that each of said tabs overhanges associated terminal fingers of said terminal plates when the control key means is at rest in a neutral position, each tab pressing its associated underlying terminal fingers into conductive contact with conducting areas of said board means in response to an associated tilting movement of the control key means.

5. The switch of claim 4, wherein each of said tabs has a step formed in its leading edge, the lower portion of the step overhanging a terminal finger of a top one of the terminal plates and the upper portion of the step overhanging a terminal finger of the bottom one of the plates, so that each tab evenly presses its underlying terminal fingers into contact with conducting areas of the board means in response to a corresponding tilting movement of the control key means.

6. The switch of claim 1 wherein said board means includes a contact lubricant for eliminating electrical arcing between said terminal fingers and the conducting areas of said board means.

7. The switch of claim 1 wherein said bar means includes two arcuate, electrically conducting terminal bars and means for mounting the bars on said select key means so that the ends of the bars contact conducting areas of said board means.

8. The switch of claim 1 wherein said board means is a printed circuit board.

9. Apparatus for adjusting the viewing position of a first and a second mirror, comprising:
    a first motor and means responsive to the motor for tilting said first mirror up and down;
    a second motor and means responsive to the motor for rotating the first mirror to the right and left;
    a third motor and means responsive to the motor for tilting said second mirror up and down;
    a fourth motor and means responsive to the motor for rotating the second mirror to the right and left;
    a printed circuit board having a plurality of conducting areas formed thereon and including means for receiving power and circuit ground and for distributing signals for controlling the movement of said motors;
    mirror select means for defining conductive connections on said printed circuit board to select either said first mirror or said second mirror for movement; and
    position control means for controlling the movement of the mirror selected by said mirror select means, the position control means including:
    a first electrically conducting terminal plate having a plurality of conducting, outwardly extending terminal fingers and means for connecting the plate and terminal fingers to an energizing voltage;
    a second electrically conducting terminal plate having a plurality of conducting, outwardly extending terminal fingers and means for connecting the plate and terminal fingers to ground;
    means for supporting said first and second terminal plates in insulated, stacked relation above said printed circuit board, so that the terminal fingers of one plate do not overlap the terminal fingers of the other plate; and
    control key means for selectively pressing terminal fingers into conductive contact with underlying conducting areas of said printed circuit board to define signals for controlling the operation of said motors.

10. The apparatus of claim 9 wherein said control key means includes a plurality of upstanding tabs, each tab responsive to a tilting movement of the control key means for pressing at least one underlying energized terminal finger and at least one underlying grounded terminal finger into conductive conduct with said printed circuit board, to define a signal for controlling the operation of one of said motors.

11. The apparatus of claim 10 wherein each of said tabs has a leading edge and the leading edge has a step formed therein for evenly pressing underlying terminal fingers into conductive contact with said printed circuit board.

12. The apparatus of claim 9 wherein said mirror select means includes at least two electrically conducting bars shaped for contacting the printed circuit board at their ends, and means for sliding the bars between a first position defining electrical connections for selecting the first mirror and a second position defining electrical connections for selecting the second mirror.

13. The apparatus of claim 12 further including detent means for resisting the movement of the mirror select means between said first and second positions.

14. The apparatus of claim 9 wherein said printed circuit board includes a contact lubricant for eliminating electrical arcing between said terminal fingers and the printed circuit board.

15. A remote control switch, comprising:
   a printed circuit board having a plurality of conducting areas formed thereon and including means for receiving power and ground and for distributing output signals;
   a plurality of electrically conducting terminal plates, each plate having a plurality of electrically conducting, outwardly extending terminal fingers;
   means for supporting the terminal plates in insulated, stacked relation above said printed circuit board, so that the terminal fingers of each plate do not overlap the terminal fingers of the other plates; and
   control key means for selectively pressing terminal fingers into conductive contact with underlying conductive areas of said printed circuit board, to generate said output signals.

16. The switch of claim 15, including means for tiltably supporting said control key means, the control key means including a plurality of upstanding tabs supported so that each of the tabs overhangs associated terminal fingers when the control key means is at rest in a neutral position, each tab pressing its associated underlying terminal fingers into conductive contact with said printed circuit board in response to an associated tilting movement of the control key means.

* * * * *

UNITED STATES PATENT AND TRADEMARK OFFICE
CERTIFICATE OF CORRECTION

PATENT NO. : 4,428,649
DATED : January 31, 1984
INVENTOR(S) : Robert T. Main and Maurice E. Kennedy It is certified that error appears in the above-identified patent and that said Letters Patent is hereby corrected as shown below:

In the specification, column 3, line 2, delete "positve" and insert therefor --positive--;

column 3, line 49, delete "the" after "if";

column 4, line 32, delete "staked" and insert therefor --stacked--;

column 9, line 10, delete "I" and insert therefor --We--.

In the claims, claim 1, line 27, delete "conducing" and insert therefor --conducting--;

claim 4, line 4, delete "overhanges" and insert therefor --overhangs--.

Signed and Sealed this

Twenty-sixth Day of November 1985

[SEAL]

Attest:

DONALD J. QUIGG

Attesting Officer

Commissioner of Patents and Trademarks